United States Patent [19]

Yu et al.

[11] Patent Number: 5,471,338

[45] Date of Patent: Nov. 28, 1995

[54] ELECTROCHROMIC DEVICE WITH PLASTIC SUBSTRATE

[75] Inventors: Phillip C. Yu, Pittsburgh; David L. Backfisch, Monroeville; Thomas G. Rukavina, Lower Burrell, all of Pa.

[73] Assignee: PPG Industries, Inc., Pittsburgh, Pa.

[21] Appl. No.: 152,343

[22] Filed: Nov. 12, 1993

[51] Int. Cl.$^6$ ........................................ G02F 1/15
[52] U.S. Cl. ............................. 359/273; 359/265
[58] Field of Search ........................... 359/265–275

[56] References Cited

U.S. PATENT DOCUMENTS

| | | | |
|---|---|---|---|
| 3,975,086 | 8/1976 | Leibowitz | 359/271 |
| 4,174,152 | 11/1979 | Giglia et al. | 359/270 |
| 4,335,938 | 6/1982 | Giglia et al. | 359/270 |
| 4,350,414 | 9/1982 | Takahashi et al. | 359/268 |
| 4,361,385 | 11/1982 | Huang et al. | 359/270 |
| 4,478,991 | 10/1984 | Huang et al. | 526/287 |
| 4,554,318 | 11/1985 | Rukavina | 525/118 |
| 4,609,703 | 9/1986 | Rukavina | 524/360 |
| 4,652,090 | 3/1987 | Uchikawa et al. | 359/267 |
| 4,670,350 | 6/1987 | Rukavina | 428/520 |
| 4,728,177 | 3/1988 | Green | 359/270 |
| 5,011,582 | 4/1991 | Oshikawa et al. | 204/140 |
| 5,142,406 | 8/1992 | Lampert et al. | 359/269 |
| 5,161,048 | 11/1992 | Rukavina | 359/275 |

FOREIGN PATENT DOCUMENTS

| | | |
|---|---|---|
| 0098416 | 12/1992 | European Pat. Off. . |
| 3-42634 | 2/1991 | Japan . |
| 4-107427 | 4/1992 | Japan . |
| 4-306614 | 10/1992 | Japan . |
| 4-318525 | 11/1992 | Japan . |

OTHER PUBLICATIONS

Cogan et al., *SPIE*, vol. 823, No. 482 (1987), "The a–WO$_3$/a–IrO$_2$ Electrochromic System" no month.

Kang et al., *J. Electrochem. Soc.*, vol. 130, No. 4, pp. 766 et sq. (Apr. 1983), "Blue Sputtered Iridium Oxide Films (Blue SIROF's)".

Rauh et al., *Solid State Ionics*, 28–30 (1988) pp. 1707–1714, "Counter Electrodes in Transmissive Electrochromic Light Modulators" no month.

Hackwood et al., *Journal of the Electrochemical Soc.*, vol. 128, No. 6, pp. 1212–1214, (Jun. 1981), "Volume Changes Induced by the Electrochromic Process in Sputtered Iridium Oxide Films".

*Primary Examiner*—John D. Lee
*Attorney, Agent, or Firm*—Donna L. Seidel; Irwin M. Stein

[57] ABSTRACT

An electrochromic article comprising plastic substrates and a method for constructing such an article are disclosed wherein two plastic substrates are coated with a primer to adhere an electroconductive metal oxide film, onto which are deposited an electrochromic film and a complementary film respectively. The two coated plastic substrates are assembled to form a cavity into which is placed a solution of monomers which are polymerized to form an ion-conducting copolymer.

12 Claims, 1 Drawing Sheet

ELECTROCHROMIC DEVICE WITH PLASTIC SUBSTRATE

BACKGROUND OF THE INVENTION

This invention relates generally to the art of electrochromic cells, and more particularly to the art of transparent electrochromic devices comprising plastic substrates.

Conventional electrochromic cells comprise a thin film of a persistent electrochromic material, i.e. a material responsive to the application of an electric field of a given polarity to change from a high-transmittance, non-absorbing state to a lower-transmittance, absorbing or reflecting state and remaining in the lower-transmittance state after the electric field is discontinued, preferably until an electric field of reversed polarity is applied to return the material to the high-transmittance state. The electrochromic film, which is both an ionic and electronic conductor, is in ion-conductive contact, preferably direct physical contact, with a layer of ion-conductive material. The ion-conductive material may be solid, liquid or gel, but is preferably a polymer layer. The electrochromic film and ion-conductive layers are disposed between two electrodes.

As a voltage is applied across the two electrodes, ions are conducted through the ion-conducting layer. When the electrode adjacent to the electrochromic film is the cathode, application of an electric field causes darkening of the film. Reversing the polarity causes reversal of the electrochromic properties, and the film reverts to its high transmittance state. Typically, the electrochromic film, preferably tungsten oxide, is deposited on a glass substrate coated with an electroconductive film such as tin oxide to form one electrode. The counter electrode has typically been a carbon-paper structure backed by a similar tin oxide coated glass substrate or a metal plate.

U.S. Pat. No. 4,174,152 to Giglia et al. discloses electrochromic devices wherein the polymeric electrolyte material is a hydrophilic copolymer of a selected acrylate or methacrylate monomer and a selected acid group containing monomer, e.g. 2-acrylamido-2-methylpropanesulfonic acid.

U.S. Pat. No. 4,335,938 to Giglia discloses electrochromic devices having a layer of tungsten oxide in contact with a layer of organic electrolyte resin comprising a hydrophilic layer of homopolymer of poly(2-acrylamido-2-methylpropanesulfonic acid) with electrode means for changing electrochromic properties of the device. A conventional electrochromic device is described as having a transparent electrochromic electrode comprising a glass substrate with a conductive tin oxide layer and an electrochromic, e.g. tungsten oxide, film; a pigmented, ion-conducting medium layer comprising a self-supporting layer of ion-conductive polymer having a pigment dispersed therein; and an opaque counter electrode such as carbon paper.

U.S. Pat. Nos. 4,361,385 and 4,478,991 to Huang et al. disclose electrochromic devices having a layer of electrochromic tungsten oxide in contact with a polymeric electrolyte wherein the stability and speed of the device are improved by using a copolymer of 2-acrylamido-2-methylpropanesulfonic acid and vinyl sulfonic acid as the polymer electrolyte. An electrochromic film on an electrode is prepared by evaporation of an amorphous film of tungsten oxide onto a glass substrate coated with conductive tin oxide. The polymer mixture is cast, dried and hydrated in contact with the electrochromic film, and then a second electrode consisting of paper-carbon is pressed against the polymer layer with a second tin oxide coated glass plate backing the carbon-paper electrode.

U.S. Pat. Nos. 4,554,318; 4,609,703 and 4,670,350 to Rukavina disclose novel copolymers of acrylic acid and cyanoethylacrylate, including terpolymers with hydroxyethylacrylate, useful as primers for bonding metal-containing coatings to organic polymer substrates.

Cogan et al. describe electrochromic devices in SPIE, Vol. 823, No. 482 (1987) comprising indium/tin oxide (ITO) coated glass electrodes, electrochromic films of tungsten oxide and iridium oxide, and a polymer electrolyte of acrylamidopropanesulfonic acid (AMPS).

SUMMARY OF THE INVENTION

Figure 1:
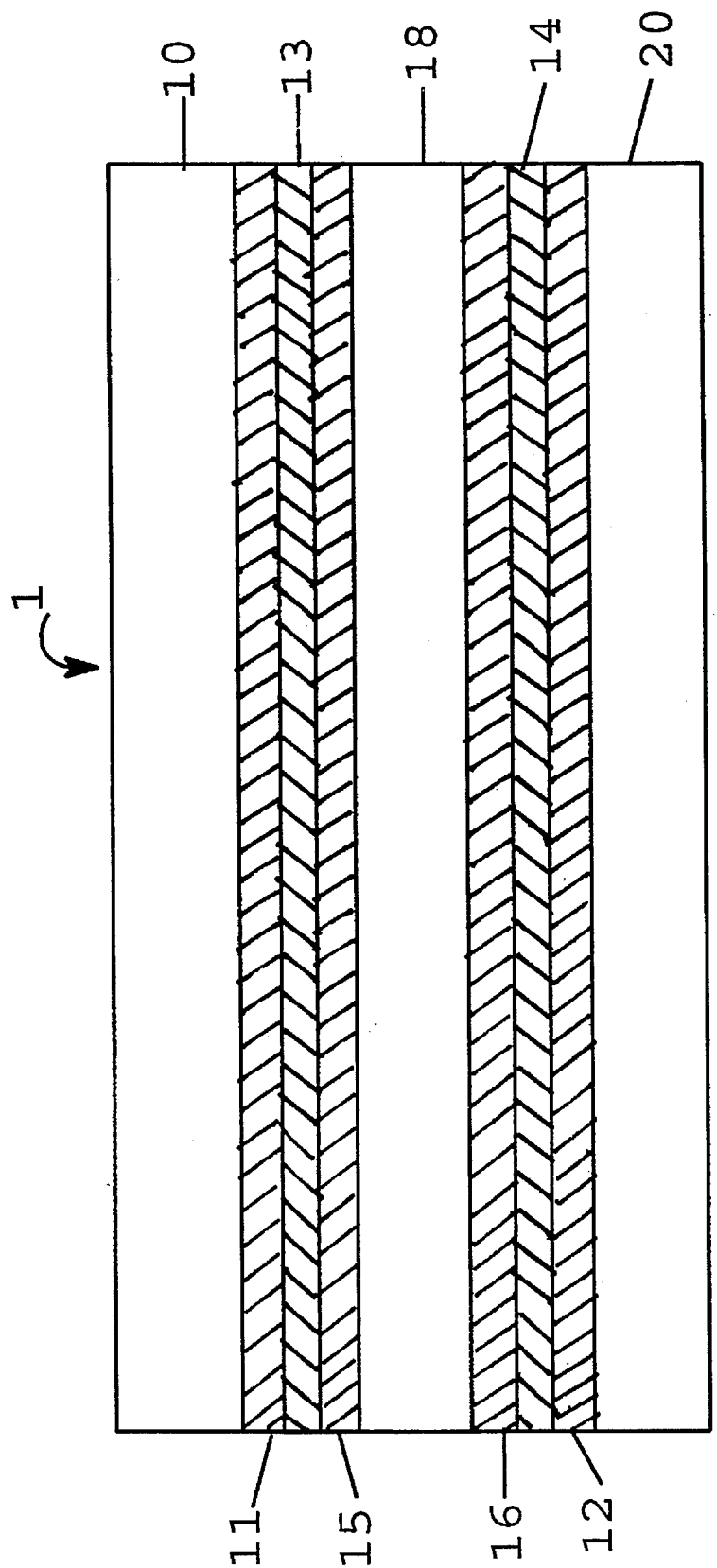
FIG. 1 is a vertical cross-sectional view of an electrochromic device of the present invention in its simplest form. Cross-hatching is used to differentiate the various layers only and not to represent any material of construction; nor is the width of an illustrated layer in the Figure indicative of the thickness of such layer.

The electrochromic device 1 of the present invention comprises a polymeric substrate 10, a primer 11 to bond an electroconductive film to a surface of the polymeric substrate 10, an electroconductive film 13, an electrochromic film 15, an ion-conductive layer 18, a complementary electrochromic film 16, and a second polymeric substrate 20, also bearing a primer 12 which bonds an electroconductive film 14 to a surface thereof. The present invention provides an electrochromic cell which is transparent, and which darkens and bleaches completely at an applied electrical potential, positive and negative, respectively.

DESCRIPTION OF PREFERRED EMBODIMENTS

The polymeric substrate of the present invention is preferably a transparent material suitable for forming lenses which may be used in eyewear. The polymeric substrate may be a low refractive index (about 1.5) material, a relatively high (about 1.6) refractive index material, or a mid-range (about 1.55) refractive index material, depending on the end use. Polycarbonate and polyacrylate substrates may be used. A preferred low index material for lenses is a polymer prepared from diethylene glycol bis(allylcarbonate), specifically a polymer prepared from CR-39® monomer, a product of PPG Industries, Inc. A preferred high refractive index substrate is bisphenol A polycarbonate. For eyewear, each lens preferably is no more than about 1 millimeter thick so that the electrochromic laminated article has a total center thickness not more than about 2.1 to 2.2 millimeters.

The electroconductive film is preferably a transparent thin film of metal or metal oxide, preferably fluorine-doped tin oxide or tin-doped indium oxide, commonly referred to as ITO (indium/tin oxide), preferably comprising a weight ratio of about 90:10 indium and tin. The film thickness is preferably in the range of 2000 to 4000 Angstroms for acceptable conductivity. The electroconductive film may be deposited by a variety of methods so long as the polymeric substrate is not deleteriously affected. High temperature pyrolyric methods typically used to deposit electroconductive films on glass are not suitable for plastic substrates. A preferred method of depositing ITO on plastic is direct current sputtering, particularly magnetron sputtering (MSVD). However, the adhesion of MSVD electroconductive metal oxide films to plastic substrates is not generally adequate for electrochromic devices of the present invention.

The primer of the present invention is disposed at the interface of the plastic substrate and electroconductive film to provide adequate adhesion of the electroconductive film to the plastic substrate, as well as to prevent crazing and/or cracking of the substrate or the electroconductive film. The primer of the present invention is an acrylate copolymer, preferably a copolymer of acrylic acid and a substituted acrylate, such as cyanoethylacrylate, hydroxyethylacrylate or methyl methacrylate. A preferred acrylate is methyl methacrylate. The molar ratio of acrylic acid to methyl methacrylate is preferably from about 3 to 1 to about 1 to 3. The primer is preferably applied to the substrate surface as a solution in an organic solvent by dip, spin, spray, flow or other conventional application technique. The solvent is then evaporated and the primer cured at slightly elevated temperature. The solvent may be n-butanol, cyclohexane, acetone, mixtures of such solvents, and is preferably 1-propanol. The solution preferably includes a curing catalyst, such as dibutyltindilaurate (DBTDL). A preferred method of applying the primer is to dip a plastic substrate into a primer solution, dry, cure, and subsequently polish the primer off the surface not coated with electroconductive film. The thickness of the primer is preferably in the range of about 0.01 to 0.50 microns, more preferably about 0.29 to 0.46 microns for optimum adhesion.

Two primed and electroconductive film coated plastic substrates are paired to form an electrochromic device in accordance with the present invention. One of the pair is further coated, over the electroconductive film, with a layer of electrochromic material. Of the various known electrochromic materials, tungsten oxide is preferred. The tungsten oxide may be deposited by thermal evaporation of tungsten oxide, but is preferably deposited by direct current (dc) magnetron sputtering of tungsten in an oxidizing atmosphere. The thickness of the tungsten oxide film is preferably in the range of 3000 to 5000 Angstroms. The tungsten oxide is in the clear state as deposited.

The other substrate is preferably further coated, over the electroconductive film, with a layer of complementary electrochromic material. Of the various known complementary electrochromic materials, iridium oxide is preferred. The substrate to be coated with iridium oxide is electrochemically reduced, so that the iridium oxide as deposited is in a reduced state. The iridium oxide is preferably deposited by radio frequency (rf) magnetron sputtering. The thickness of the iridium oxide film is preferably in the range of 300 to 800 Angstroms.

After the two substrates have been primed, electroconductive film coated and electrochromic film coated, the pair are assembled to form a cell. Between the coated surfaces is disposed a layer of polymer which bonds with both surfaces to form a laminated article. The polymer is preferably an ion-conductive polymer electrolyte. In accordance with the present invention, the polymer electrolyte is preferably a proton-conducting polymer. Homopolymers of 2-acrylamido-2-methylpropane-sulfonic acid (AMPS®—a registered trademark of Lubrizol) and copolymers of AMPS with various monomers may be utilized in the form of preformed sheets which are laminated between the substrates, or in the form of liquid reaction mixtures of monomers which are cast and cured in place. A preferred proton-conducting polymer electrolyte in accordance with the present invention is a copolymer of AMPS and N,N-dimethylacrylamide (DMA), preferably cast and cured in place. The thickness of the polymer electrolyte is preferably in the range of 0.001 to 0.025 inch (0.0254 to 0.635 millimeter), more preferably 0.005 to 0.015 inch (0.127 to 0.381 millimeter).

The AMPS/DMA copolymer proton-conductive electrolyte of the present invention is preferably cast in place as a solution of monomers in 1-methyl-2-pyrrolidinone (NMP) and water. The solution preferably comprises an initiator to polymerize the monomers upon exposure to actinic radiation, preferably ultraviolet (UV) light. Preferred UV initiators include benzoin methyl ether and diethoxyacetophenone. The monomer solution may be poured between two electroconductive and electrochromic coated polymer substrates assembled together with a 0.15 to 0.020 inch (0.127 to 0.508 millimeter) Teflon® spacer held in place with commercially available sealant, e.g. Torr Seal® from Varian Vacuum Products. For a pair of lens substrates, the monomer solution may be poured onto the concave surface of one lens and the convex surface of the other lens may be placed over the monomer solution, thus forming the solution into a thin film. Exposure to UV light sufficient to cure the polymer electrolyte is typically about 30 minutes for a mercury lamp and about 1 to 3 minutes for a xenon lamp. UV inhibitors to protect the polymer from long term exposure to solar radiation may be used if the polymer contains appropriate UV initiators for curing upon exposure to long wavelength UV radiation.

The resultant electrochromic lens is generally crackfree with insignificant haze (0.3 to 0.4%). The electrical connections to the electrochromic device are preferably made with electronic conductive bus bars. The optical transmittance at 550 nanometers is typically about 75 percent in the bleached state and a minimum of about 3 percent in the darkened state in the voltage range of from about +1.5 to −1.5 volts for a charge in the range of about 23 to 29 millicoulombs per square centimeter ($mC/cm^2$).

The present invention will be further understood from the descriptions of specific examples which follow:

EXAMPLE I

Electrochromic devices were constructed by a cast-in-place technique involving the following steps. The plastic substrates, polymerized from CR-39® monomer, were soaked in 40 percent aqueous potassium hydroxide (KOH) for two minutes, rinsed in deionized water, and then rinsed again in distilled water. Following cleaning, the substrates were dried with nitrogen. Next, the primer was deposited onto the plastic. The primer was a copolymer of acrylic acid (AA), and methylmethacrylate (MMA) in a solvent mixture of butanol and 1-propanol. The base oligomer preparation was 25 percent solids having a mole ratio of 3 AA/1 MMA. The weight percents of the oligomer were 17.09 percent acrylic acid, 7.91 percent methylmethacrylate, 74.99 percent butanol; 0.01 percent aziobisisobutyronitrile was added as thermal initiator. The oligomer was stirred under nitrogen and thermally polymerized at 90° C. for 24 hours.

The primer solution consisted of mixing 21.6 weight percent base oligomer (25 percent solids), 73.71 weight percent 1-propanol, 0.05 weight percent dibutyltindilaurate, 0.04 weight percent surfactant (FC-430 fluoropolymer from 3M), and 4.6 weight percent of crosslinking agent 2(3,4-epoxycyclohexyl-5,5-spiro-3,4-epoxy) cyclohexane-metadioxane (ERL-4234 from Union Carbide). The plastic substrate was dip-coated into the primer solution at a draw rate of about 1 inch (2.54 centimeters) per 10 to 11 seconds in a laminar flow hood. Following dip-coating, the substrates were placed in a vented oven, where the primer/plastic was cured for 8 hours at 80° C. Primer thickness was estimated to be 0.25 to 0.51 microns. The substrates were discharged of electrostatic by a Zerostat® gun (Discwasher) and then dried with nitrogen gas.

Thin films of $In_2O_3$:Sn(ITO) were deposited onto primer/plastic substrates using direct current (dc) magnetron sputtering. The films were deposited at a substrate temperature of 60° C. in an atmosphere of 80 percent argon and 20 percent oxygen at 2 kilowatts (kW), for a target size of 40×6×¼ inches (101.6×15.2×0.635 cm). The target was 90 weight percent indium and 10 weight percent tin. Film thicknesses of ITO were approximately 2800 Å with sheet resistances of 20 to 30 ohms per square ($\Omega$/sq). The optical transmittance of the ITO/primer/plastic, at 550 nanometers, was between 82 and 87 percent.

Following the ITO coating, the electrochromic layers were separately deposited onto ITO/primer/plastic substrates. Tungsten oxide thin films were deposited by direct current (dc) magnetron sputtering, and iridium oxide thin films by radio frequency (rf) magnetron sputtering. The deposition conditions for tungsten oxide included a base pressure of $5\times10^{-5}$ Torr; the actual coating pressure was $2\times10^{-3}$ Torr, where the gas mixture was 44 percent oxygen and 56 percent argon. The power was 2 kW, and the distance from target to the substrate was 28.5 inches (72.4 centimeters). The tungsten target was 99.9 percent pure, and its size was 40 ×6×¼ inches (101.6×15.2.∴0.635 centimeters). Film thicknesses of tungsten oxide were approximately 3900 Angstroms.

Sputtering of iridium oxide was achieved using an iridium target 2.87 inches (7.3 centimeters) in diameter, where the distance from the target to the substrate was six inches (15.2 centimeters). The base pressure of the chamber was $2.5\times10^{-5}$ Torr. The deposition took place in an oxygen atmosphere, where the pressure was $25\times10^{-3}$ Torr. The rf power was 125 Watts for a duration of seventy minutes. The resulting thickness of iridium oxide was approximately 625 Angstroms. For the entire deposition, the target and chamber were water cooled.

Following these depositions, the $IrO_2$/ITO/primer/polymer substrate was electrochemically charged in 0.1 normal aqueous hydrochloric acid (HCl); the accumulated charge was approximately 23 millicoulumbs per square centimeter ($mC/cm^2$). The electrochemical preconditioning was accomplished under galvanostatic conditions, where the applied current was $1.5\times10^{-3}$ amps, and the voltage limit set at 1.5 volts. The $WO_3$/ITO/primer/polymer substrate was not electrochemically treated.

The ion conducting copolymer consisted of 2-acrylamido-2-methylpropanesulfonic acid (AMPS) and N,N-dimethylacrylamide (DMA) in 1-methyl-2-pyrrolidinone (NMP) and water. The weight percentage of all components in this polymer were 28 percent AMPS, 47 percent DMA, 6 percent NMP, and 19 percent water. Four drops of the UV initiator, diethoxyacetophenone, were also added to this solution for every 5 grams of monomer mixture.

The electrochromic working electrode, $WO_3$/ITO/primer/polymer substrate, was placed together with its electrochromic counter-electrode, iridium oxide/ITO/primer/polymer substrate, using a Teflon® spacer. The aforementioned ion conducting monomer was then cast between the EC electrodes at thicknesses between 0.005 and 0.020 inch (0.127 and 0.508 cm). The laminates were then exposed to UV light to cure the ion conducting polymer. Immediately following the cure, Torr Seal® (Varian Vacuum Products) was applied to all edges to seal the device. The electrical connections to the electrochromic device were made with a conductive silver epoxy (Tra-Con, Inc.) bus bar. Finally, the primer on the outer faces of the device was removed using Novus® Plastic Polish No. 1 and No. 2 (Novus Inc.).

EXAMPLE II

Electrochromic devices were constructed by a cast-in place technique as in Example I, with the following exceptions. The primer was a terpolymer of cyanoethylacrylate (CEA), acrylic acid (AA), and methylmethacrylate (MMA) in a solvent mixture of cyclohexanone and acetone. For the primer of this example, the base oligomer was 25 percent solids having a mole ratio of 1.2 CEA/2 AA/1 MMA. The weight percents of the oligomer composition were 9.75 percent 2-cyanoethylacrylate, 9.0 percent acrylic acid, 6.25 percent methyl methacrylate, and 75 percent cyclohexanone; 0.04 percent aziobisisobutyronitrile was added as thermal initiator.

The oligomer was thermally polymerized at 90° C. for 24 hours as in Example I. The primer solution consisted of mixing 21.6 weight percent base oligomer (25 percent solids), 36.86 weight percent cyclohexanone, 36.85 weight percent acetone, 0.05 weight percent dibutyltindilaurate, 0.04 weight percent surfactant (FC-430 from 3M), and 4.6 weight percent crosslinking agent (ERL-4234 from Union Carbide). The plastic substrate was dip-coated into the primer solution. Following dip-coating, the substrates were placed in a vented oven, where the primer/plastic substrate was cured for 8 hours at 80° C. Primer thickness was estimated to be 0.25 to 0.51 microns. The substrates were discharged of electrostatic by a Zerostat® gun (Discwasher) and then dried with nitrogen gas.

Thin films of $In_2O_3$:Sn(ITO) were deposited onto primer/plastic substrates using direct current (dc) magnetron sputtering. The films were deposited at a substrate temperature of 60° C. Film thicknesses were approximately 2800 Angstroms with a sheet resistances of 20–30 $\Omega$/sq. The optical transmittance of the ITO/primer/plastic substrate, at 550 nm, was between 82 and 87 percent. The electrochromic layers were separately deposited onto ITO/primer/plastic substrates as in the previous examples, tungsten oxide thin films by direct current (dc) magnetron sputtering and iridium oxide thin films by radio frequency (rf) sputtering.

Following these depositions, the $IrO_2$/ITO/primer polymer was electrochemically charged in 0.1 N HCl; the accumulated charge was approximately 23 $mC/cm^2$. The electrochemical pre-conditioning was accomplished under galvanostatic conditions, where the applied current was $1.5\times10^{-3}$ amps, and the voltage limit set at 1.5 Volts. The $WO_3$/ITO/primer/polymer substrate was not electrochemically treated.

The ion conducting copolymer consisted of 2-acrylamido-2-methylpropanesulfonic acid (AMPS) and N,N-dimethylacrylamide (DMA) in 1-methyl-2-pyrrolidinone (NMP) and water. The weight percentage of all components in this polymer were 28 percent AMPS, 47 percent DMA, 6 percent NMP, and 19 percent water. Four drops of the UV initiator, diethoxyacetophenone, were also added to this solution for every 5 grams of monomer mixture.

The electrochromic working electrode, $WO_3$/ITO/primer/polymer substrate, was placed together with its electrochromic counter-electrode, iridium oxide/ITO/primer/polymer substrate, using a Teflon® spacer. The aforementioned ion conducting monomer was then cast between the EC electrodes, at thicknesses between 0.005 and 0.020 inch (0.127 and 0.508 cm). The laminates were then exposed to UV light to cure the ion conducting polymer. All edges of the device were sealed, electrical connections to the electrochromic device were made, and the primer on the outer faces of the device was removed.

EXAMPLE III

A solution of 1 mole of hydroxyethylacrylate, 1 mole of acrylic acid, and 1 mole of 2-cyanoethylacrylate was prepared in cyclohexanone at 25 weight percent monomers. To this solution was added 0.05 weight percent azobisisobutyronitrile by weight of the monomers. The solution was sparged with nitrogen for 15 minutes, and the reaction mixture heated to 90° C. for 24 hours under inert atmosphere. The oligomer solution was then diluted to a 10 percent solids. To this solution was added a stoichiometric amount of 2-[3,4-epoxy cyclohexyl-5,5-spiro-3,4-epoxy] cyclohexane-metadioxane to react all of the carboxylic acid groups and the hydroxyl moieties derived from hydroxyethylacrylate. A surfactant (FC-430 from 3M) was added at 0.05 percent by weight of the solution along with 0.1 percent of dibutyltin dilaurate catalyst for the cycloaliphatic epoxy/hydroxyl/carboxylic acid reaction. A 70 millimeter diameter, 2 millimeter thick 6 base plano lens substrate of polymer based on CR-39 monomer (PPG Industries, Inc.) was dip-coated in the above solution. The solvents were evaporated and the film cured at 180° F. (about 82° C.) for 8 hours.

An electroconductive coating of indium/tin oxide (ITO) was then deposited onto these substrates by direct current (dc) magnetron sputtering at a temperature of 140° F. (60° C.). The thickness of the indium/tin oxide (ITO) layer was about 2800 Angstroms.

The electrochromic materials, tungsten oxide and iridium oxide, were separately vacuum deposited onto the electroconductive primed substrates by thermal evaporation and radio frequency (rf) magnetron sputtering techniques respectively. The deposition conditions for thermal evaporation of tungsten oxide included a base pressure of $5 \times 10^{-5}$ Torr. A voltage of 1.1 kilovolts (kV) was then applied to the evaporation boat of tungsten oxide for fifteen minutes; the deposition rate was 7 nanometers per second (nm/sec). The terminating thickness was 3700±500 Angstroms. A glow discharge consisting of an argon gas plasma was then applied to the surface of the tungsten oxide film for fifteen minutes. The plasma exposure was found to improve the adhesion of the electrochromic film to the ion conducting polymer electrolyte.

Sputtering of iridium oxide was performed using an iridium target 2.87 inches (7.29 centimeters) in diameter at a distance from the substrate of six inches (15.24 centimeters). The base pressure of the chamber was $2.5 \times 10^{-5}$ Torr. The gas composition was 100 percent oxygen, with a pressure of $2 \times 10^{-3}$ Torr. The rf power was 75 watts (W) for a duration of eight minutes. The resulting thickness was approximately 400 Angstroms. Again, a glow discharge consisting of an argon gas plasma was applied to the surface of the iridium oxide film for fifteen minutes.

Following the vacuum depositions of the above layers, the $WO_3$/ITO/primer/polymer lens was electrochemically charged in 0.1 N hydrochloric acid solution; the accumulated charge was approximately 23 millicoulombs per square centimeter ($mC/cm^2$). The electrochemical pre-conditioning was accomplished under galvanostatic conditions, where the applied current was $1.5 \times 10^-$ amps. The iridium oxide/ITO/primer/polymer lens was not electrochemically treated.

The two lenses were assembled with their coated surfaces in facing relationship, spaced 0.020 inch (0.508 millimeter) apart by means of a Teflon® spacer. A solution comprising 2-acrylamido-2-methylpropane-sulfonic acid (AMPS®) and N,N-dimethylacrylamide (DMA) in 1-methyl-2-pyrrolidinone (NMP), water and diethoxyacetophenone UV initiator was cast into the cavity and polymerized by means of exposure to ultraviolet light for 30 minutes.

Electrical connections to the electrochromic lens were made with copper tape and were insulated with Teflon® tape. The electrochromic lens darkened to 18 percent transmittance upon application of +1.2 volts for 2 minutes and completely bleached to 58 percent transmittance upon application of −0.5 volts for 1.5 minutes.

EXAMPLE IV

An electrochromic lens was prepared as in Example I with the following modifications. The substrates were 2 inches square, flat and 2 millimeters thick. The tungsten oxide layer was about 3800 Angstroms thick and was precharged at $1.5 \times 10^{-3}$ amps for 5.5 minutes to 0.43 coulombs for an area of about 19 square centimeters. The iridium oxide layer was about 600 Angstroms thick. The proton-conductive electrolyte was about 0.010 inch (0.254 millimeter) thick and formed from a solution comprising 5.0 grams of 2-acrylamido-2-methylpropanesulfonic acid, 1.29 grams of dimethylacrylamide, 2.20 grams of NMP, 1.51 grams of water and 1 drop of 1 percent benzoin methyl ether (BME) in dimethylformamide (DMF) as photoinitiator. The copolymer electrolyte was cured for 30 minutes by means of exposure to ultraviolet light using a mercury lamp. There were no visible cracks or haze in the finished lens, which darkened and bleached completely in one minute for each transition.

EXAMPLE V

An electrochromic lens was prepared as in the previous example with the following modifications. The tungsten oxide coated substrate was precharged for 6.5 minutes at $1.5 \times 10^{-3}$ amps to 0.465 coulombs for an area of about 19 square centimeters. The copolymer electrolyte was cast and cured in place from a solution comprising 2.5 grams of AMPS, 1.74 grams of DMA, 0.76 grams of water and 1 drop of 1 percent BME in DMF. The finished article switched from 58 percent transmittance at 550 nanometers to 18 percent upon passing of 0.214 coulombs in 2 minutes, and bleached back to its original transmittance upon passing of 0.213 coulombs in 1.5 minutes. There was no recordable haze.

The above examples are offered to illustrate the present invention without limiting its scope, the scope of which is defined by the following claims. Various other materials and process conditions may be used. For example, while the examples utilize ITO as an electroconductive film, other materials such as fluorine-doped tin oxide, antimony-doped tin oxide and aluminum-doped zinc oxide could be used, preferably with sheet resistances in the range of 10 to 20 ohms per square. Other polymer electrolytes, for example comprising hydrogen uranyl phosphate or polyethylene oxide/ $LiClO_4$, may also be employed, as well as polymer adhesive layers in combination with inorganic films such as $LiNbO_3$, $LiBO_3$, $LiTaO_3$, $LiF$, $Ta_2O_5$, $Na_2AlF_6$, $Sb_2O_5 \cdot nH_2O + Sb_2O_3$, $Na_2O \cdot 11Al_2O_3$, $MgF_2$, $ZrO_2$, $Nb_2O_5$ and $Al_2O_3$. In addition to tungsten oxide, $WO_3$, other cathodically coloring materials such as $MoO_3$, $V_2O_5$, $Nb_2O_5$, $TiO_2$, $Cr_2O_3$, $RuO_2$ and $PRO_2$, may be compatible with the other components of the electrochromic device of the present invention, as well as ternary metal oxides and tungsten bronzes, such as $MoWO_3$, $NbWO_3$, $K_{1-x}WO_3$ and $Na_{1-x}WO_3$, where x is less than 1. In addition to the preferred iridium oxide, other anodically coloring materials which may be used include NiO, $Fe_4[F_3(CN)_6]_3$, $V_2O_5$, $RhO_3$ and $LiCoO_2$. The counter electrode may also be passive, instead of complementary coloring, utilizing material such as $In_2O_3$, tin-doped indium oxide (ITO) and $Nb_2O_5$. Organic electrochromic materials such as polyaniline and viologens (1,1-diheptyl-4, 4-bipyridinium dibromide) may also be used in the electrochromic devices of the present invention, the scope of which is defined by the following claims.

We claim:

1. An electrochromic article comprising:
   a. a first transparent polymeric substrate;
   b. a first transparent primer layer of a copolymer of acrylic acid and a monomer selected from the group consisting of hydroxyethylacrylate, cyanoethylacrylate, methyl methacrylate and mixtures thereof deposited on a surface of said first substrate;
   c. a first transparent electroconductive metal oxide film deposited on said first primer layer;
   d. a transparent electrochromic film deposited on said first electroconductive metal oxide film;
   e. a second transparent polymeric substrate;
   f. a second transparent primer layer of a copolymer of acrylic acid and a monomer selected from the group consisting of hydroxyethylacrylate, cyanoethylacrylate, methyl methacrylate and mixtures thereof deposited on a surface of said second substrate;
   g. a second transparent electroconductive film deposited on said second primer layer;
   h. a transparent complementary electrochromic film deposited on said second electroconductive film; and
   i. a transparent ion-conducting polymer disposed between and bonded to said electrochromic and complementary electrochromic films.

2. An article according to claim 1, wherein each of said polymeric substrates is selected from the group consisting of polycarbonates and acrylics.

3. An article according to claim 1, wherein each of the polymeric substrates is a polymer reaction product of a monomer selected from the group consisting of diethylene glycol bis(allylcarbonate), bisphenol A and methyl methacrylate.

4. An article according to claim 1, wherein each of said electroconductive films is selected from the group consisting of tin oxide and indium/tin oxide.

5. An article according to claim 1 wherein said electrochromic film deposited on said first electroconductive metal oxide film is tungsten oxide.

6. An article according to claim 1, wherein said complementary film is iridium oxide.

7. An article according to claim 1, wherein said ion-conducting polymer is a proton-conducting polymer.

8. An article according to claim 1 wherein said primer layer on each of said polymer substrates is a copolymer of acrylic acid and methyl methacrylate monomers in a molar ratio of about 3:1 to 1:3.

9. An electrochromic article comprising:
   a. a transparent polymeric substrate;
   b. a transparent copolymer primer layer of a copolymer of acrylic acid and a monomer selected from the group consisting of hydroxyethylacrylate, cyanoethylacrylate, methyl methacrylate and mixtures of said monomers deposited on a surface of said substrate;
   c. a transparent electroconductive metal oxide film deposited on said primer layer;
   d. a transparent electrochromic film deposited on said electroconductive metal oxide film;
   e. a second transparent polymeric substrate;
   f. a second transparent copolymer primer layer of a copolymer of acrylic acid and a monomer selected from the group consisting of hydroxyethylacrylate, cyanoethylacrylate, methyl methacrylate and mixtures of said monomers deposited on a surface of said second substrate;
   g. a second transparent electroconductive film deposited on said second primer layer;
   h. a transparent complementary electrochromic film deposited on said second electroconductive film; and
   i. a transparent proton-conducting polymer of 2-acrylamido-2-methylpropanesulfonic acid disposed between and bonded to said electrochromic and complementary films.

10. An article according to claim 9 wherein said proton-conducting polymer is a copolymer of 2-acrylamido-2-methylpropanesulfonic acid and dimethylacrylamide.

11. An article according to claim 10 wherein the thickness of the proton-conducting polymer is from 0.001 to 0.025 inch.

12. An electrochromic article comprising the following transparent layers:
   a. a substrate polymerized from diethylene glycol bis(allylcarbonate) monomer;
   b. a primer layer copolymerized from acrylic acid and methyl methacrylate deposited on a surface of said substrate;
   c. an electroconductive film comprising tin-doped indium oxide deposited on said primer layer;
   d. an electrochromic film of tungsten oxide deposited on said electroconductive film;
   e. a second substrate polymerized from diethylene glycol bis(allylcarbonate) monomer;
   f. a second primer layer copolymerized from acrylic acid and methyl methacrylate deposited on a surface of said second substrate;
   g. a second electroconductive film comprising tin-doped indium oxide deposited on said second primer layer;
   h. a complementary electrochromic film of iridium oxide deposited on said second electroconductive film; and
   i. a proton-conducting copolymer of 2-acrylamido-2-methylpropanesulfonic acid and N,N-dimethylacrylamide disposed between and bonded to said electrochromic films.

* * * * *